Oct. 26, 1965            H. ADLER            3,213,544
INSTRUMENT FOR COMPUTING TIME OF ARRIVAL AT A DESTINATION
Filed March 20, 1962
FIG.1
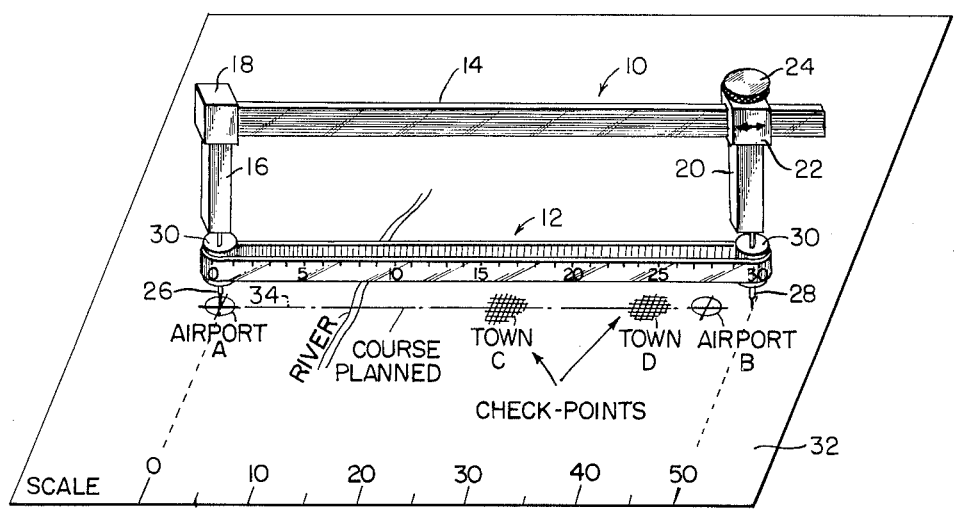
INITIAL EST. SPEED - 100 MPH ( 50 MI. PER ½ HR.)
(SET COMPASS AS ABOVE)
| CHECK-POINTS | INITIAL E.T.A. | DISTANCE MILES | ACTUAL TIME | CORRECTION | NEW E.T.A |
|---|---|---|---|---|---|
| RIVER | 8 MIN. | 13 | 10 MIN. | ADJUST COMPASS UNTIL 10 COINCIDES WITH RIVER | |
| TOWN C | 16 MIN. | 27 | | | 20 |
| TOWN D | 24 MIN. | 40 | | | 29 |
| AIRPORT B | 27 MIN. | 45 | | | 32 |
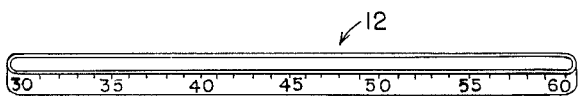
FIG.2
INVENTOR.
HAROLD ADLER
BY *Kenway, Jenney & Hildreth*
ATTORNEYS 3,213,544
INSTRUMENT FOR COMPUTING TIME OF
ARRIVAL AT A DESTINATION
Harold Adler, Huckleberry Hill, Lincoln, Mass.
Filed Mar. 20, 1962, Ser. No. 181,058
1 Claim. (Cl. 33—158)

This invention relates to instruments useful for computing, en route, an estimated time of arrival at a destination on the basis of an average speed made good during a then-completed portion of a journey. Such instruments are particularly useful in aircraft flights, for which Government regulations require that the estimated time of arrival at a destination airport be computed and reported by radio at a series of pre-determined check-points along a planned flight path; but also have utility for marine and land journeys.

There is consequently a need, particularly in small private aircraft, for an inexpensive and compact instrument of reasonable accuracy by means of which the pilot may, while continuing to manipulate the aircraft controls, quickly re-estimate the time of arrival at a destination airport as he passes each of a succession of pre-determined check-points, such as rivers, towns, conspicuous topographical landmarks, and the like. It is almost physically impossible to carry out extensive computations with pencil and paper, but the probability of error is dangerously increased with extensive mental computations, involving the recollection of various figures, are attempted. For the solution of this difficulty, it has previously been proposed to utilize a conventional divider having an expansible scale marked in time units. To use this instrument, the aviator first sets the points of the divider on the mileage scale of the chart so that the distance on the chart scale which can be covered at an estimated speed in a unit time corresponds to that time on the expansible scale. The graduations on the divider scale will thus indicate the time elapsed from take-off which will be required to reach each successive check-point on the planned flight path, provided that the estimated average speed is maintained. Once in flight, and on arrival at each check point, the aviator must re-set the divider to correspond to his actual average speed made good up to that point, by noting the clock time and mentally computing the actual elapsed time from take-off in minutes, and then resetting the expansible scale to cause that number of minutes to register with the check-point in question. He then reads the estimated time registering with the destination airport on the chart, mentally re-computes the estimated clock time of arrival, and radios ahead the revision in schedule. This process, however, requires the pilot mentally to convert between elapsed time and clock time twice: first as he computes the actual elapsed time at the check point from the take-off and current clock readings, and second as he re-converts the estimated elapsed time to the destination airport back into clock time. These computations not only distract him from the necessary activity of piloting the aircraft, and therefore detract from safety, but are also quite likely to result in error, since his full attention obviously cannot be given to these time conversions.

It is the primary object of my invention to provide an improved instrument for computing an estimated time of arrival at a destination, which completely eliminates mental recollection and computation of figures en route.

It is a further object of my invention to provide an improved and inexpensive instrument for estimating a time of arrival during a journey, whose operation does not require knowledge of any information with respect to time elapsed, or average speed previously made good, at a check-point. Other objects and advantages of the invention will appear as the following description proceeds.

Briefly stated, according to a preferred embodiment thereof, I may carry out my invention by providing a divider, which is preferably a beam compass, with an expansible time scale which is mounted in bodily movable relation on the index points of the divider, so that the point on the scale which registers on a chart with a location currently arrived at, can be set to the actual clock time of arrival.

Preferably, the expansible scale comprises a loop, such as a rubber band, having a time scale of sixty minutes running about the periphery thereof, and is reeved about a pair of rollers rotatably supported on the respective index points of the divider. In this manner, the scale may be rolled about the index points to bring the actual clock time in minutes into register with the point of origin on the chart, or into register with any intermediate check-point along the planned flight path, while insuring equal tension (and thus equal length) in each of the two spans of the scale between the legs of the divider.

In use, the divider is pre-set in such a way that the mileage which can be traveled at the initially-estimated average speed in a unit time, corresponds in chart scale to that unit time on the divider scale. One index point is set at the place of origin on the chart, and the expansible scale is adjusted to bring the current clock time into register with that index point. One may then immediately read from the expansible scale the estimated clock time of arrival at the airport of destination. During the flight, as each successive check-point is reached, the user merely adjusts the expansible scale and the legs of the divider to cause the current clock time in minutes to appear on the scale in coincidence with the check-point on the chart. He may then read directly from the scale, without mental computation or any consideration of the actual elapsed time or actual speed made good thus far, a new estimated clock time of arrival at the destination airport, or at any further intermediate check-point. This operation may be performed with one hand with great facility, and provides little opportunity for error or distraction from piloting activities, because of the absence of any mental computation.

While the specification concludes with the claim particularly pointing out the subject matter which I regard as my invention, it is believed that a clearer understanding may be gained from the following detailed description of a preferred embodiment, referring to the accompanying drawings, in which:

FIG. 1 is a perspective view of a preferred embodiment of my improved instrument, shown applied to an illustrative chart, together with a table giving an example of the use of the instrument; and FIG. 2 is a view showing the reverse side of an expansible scale element of the instrument of FIG. 1.

Referring to the drawings, my improved instrument generally comprises a divider or beam compass 10 and an expansible scale 12, which in the preferred embodiment comprises a loop of rubber or other elastic material, clearly marked with a time scale graduated into sixty minutes about the periphery of the loop. The reverse sides of the scale are shown in FIGS. 1 and 2 for greater clarity. The compress 10 includes a beam 14 at one end of which is fixed a first leg 16 by means of a suitable block 18, and on which is mounted in longitudinally slidable relationship a second leg 20 by means of a sliding block 22, having a knurled screw 24 for conveniently fixing the leg 20 in any adjusted position. A beam compass of this type is desirable for use in my instrument because of the wide range of relative movement of the legs, but a compass in which the legs are pivoted to one another may alternatively be used.

A pair of rollers 30 are rotatably mounted on the legs 26 and 28, and the expansible scale 12 is reeved about these rollers so that the tension in the two spans of the scale is maintained equal at all times. In this manner, the scale may be moved about the rollers without unequally stretching the spans and introducing inaccuracy into the readings. The rollers may be omitted if desired, but the increased friction between the scale and the index points may necessitate considerable manual adjustment of the scale to secure equal tension in the spans after the scale is moved. The rollers may comprise cylindrical members of low-friction material, such as brass, or may be provided with anti-friction bearings if desired.

To illustrate the use of the computer, a chart 32 is shown in FIG. 1, marked with a pre-planned flight path shown in dotted lines at 34, between an airport A of origin and an airport B of destination. A flight plan is filed in advance of departure, which includes a specified series of check-points along the flight path; these are shown by way of example to include a river, town C and town D. Before departure, the flight speed is estimated in a conventional manner, considering air speed and current wind direction and velocity over the flight path.

The instrument is then placed on the chart scale, and the expansible scale is extended by moving leg 20, to correspond thirty minutes on the time scale to the distance which is expected to be covered in that time at the estimated speed; e.g., fifty miles at an estimated speed of one-hundred miles per hour. The compass is shown adjusted to this setting in FIG. 1. At the time of departure, the expansible scale is rolled about the legs until the actual clock time in minutes appears at index point 26, which is then set on airport A of departure. It is assumed in this example that departure takes place on the hour, and the scale is accordingly set to zero at point A. The initially estimated clock time of arrival at airport B, as well as at the various checkpoints, can then be read directly from the scale, and is recorded in the table of FIG. 1 as twenty-seven minutes. In actual practice, there is no necessity for recording this information, and the table is shown only to clarify the example. The time of departure and the initially estimated time of arrival at airport B are then communicated to that airport.

During the flight, it may, for example, occur that the river check-point is reached at ten minutes after the hour, rather than in the estimated time of eight minutes. It is then necessary to adjust the second leg 20 along the beam of the compass 10 until the ten minute index on the scale coincides with the river; a new estimate of the clock time of arrival at airport B may then be read directly from the scale, without any reference to the actual speed made good or the time elapsed during the preceding portion of the flight. The new estimated clock times of arrival at towns C and D are also shown in the table to complete the example.

It will be apparent that in the event the flight is of a greater duration than one-half hour, the compass may simply be pivoted 180° about the index point 28, to bring the scale span 30–60 (see FIG. 2) into play for the second half hour of flight, an then pivoted successively about points 26 and 28 to follow the complete flight path. No additional computation is necessary, since one full hour is covered by each pair of successive positions of the compass.

It will be apparent from the foregoing description that my improved instrument not only eliminates the need for mental computation and conversion between elapsed time and actual clock time, but also that is can be manipulated with facility and without unduly distracting the efforts and attention of the aviator from piloting activity.

Not only is the obvious danger of distraction thereby greatly reduced, but also the possibility of error through erroneous recollection of data.

While I have shown and described a preferred embodiment of my invention by way of illustration, it will be apparent to those skilled in the art that various additional changes and modifications may be made without departing from the true spirit and scope of the invention. While in the embodiment herein described and shown the scale is divided into sixty minutes, higher or lower speeds of travel may require greater or lesser time scales, in order to avoid inconvenience in manipulation and operation of the instrument. An alternative means for providing a longer time scale is to form it as a mobius strip, in which a loop is cut at one point and one of the free ends reversed and reconnected to the remaining free end. In this manner, the total period of time indicated on the scale may be twice as great as with a conventional loop, with the same spacing of indicia. For aircraft whose flight speed ranges between 100 and 200 miles an hour, such a mobius strip scale could be conveniently divided into a three hour period, so that each span between the index points of the compass would represent ¾ of an hour. It will be understood, however, that the choice of time indicia is merely a matter of convenience, having due reference to the scales of the charts with which the instrument is intended to be used, and the speed range of the vehicle. Another modification which may increase the convenience of manipulation of the instrument would be the provision of a pair of protrusions on the sliding block which supports the movable index point, and on the free end of the beam, so that the movable point could be adjusted merely by squeezing the protrusions with the thumb and forefinger, against the tension of expansible scale. Further, in place of a locking screw for securing the movable leg in its adjusted position, the movable leg might be mounted on a block loosely received on the beam, so that it would be canted by the tension of the scale into lock-engagement with the beam in an adjusted position. To make this locking action more secure, means such as ratchet teeth formed on the bottom surface of the beam could also be provided for engaging with the canted block.

What I claim is:

An instrument for computing estimated clock time of arrival of a transient at a destination, comprising a divider having two relatively movable index points, a pair of rollers each mounted on one of said index points, and an expansible scale comprising a loop reeved about said rollers for expansion and contraction upon relative movement of said index points, said expansible scale having a time index inscribed thereon and being bodily rotatable about said rollers, whereby the time indicated at any point on said scale may be adjusted to correspond to actual clock time.

References Cited by the Examiner

UNITED STATES PATENTS

| | | | |
|---|---|---|---|
| 2,388,303 | 11/45 | Wise | 33—137 |
| 2,396,929 | 3/46 | Putnam | 33—137 |
| 2,418,985 | 4/47 | Posey | 33—137 |
| 2,512,184 | 6/50 | Suydam | 33—137 |
| 2,621,412 | 12/52 | Slusher | 33—158 |
| 3,024,590 | 3/62 | Wynne | 235—70 |

ISAAC LISANN, *Primary Examiner.*

ROBERT EVANS, *Examiner.*